(12) United States Patent
Ogura

(10) Patent No.: US 12,536,337 B2
(45) Date of Patent: Jan. 27, 2026

(54) MANAGEMENT DEVICE AND PROGRAM

(71) Applicant: LE-TECHS INC., Tokyo (JP)

(72) Inventor: Takashi Ogura, Tokyo (JP)

(73) Assignee: Le-Techs Inc., Tokyo (JP)

( * ) Notice: Subject to any disclaimer, the term of this patent is extended or adjusted under 35 U.S.C. 154(b) by 268 days.

(21) Appl. No.: 18/034,839

(22) PCT Filed: Nov. 2, 2020

(86) PCT No.: PCT/JP2020/041090
§ 371 (c)(1),
(2) Date: May 1, 2023

(87) PCT Pub. No.: WO2022/091415
PCT Pub. Date: May 5, 2022

(65) Prior Publication Data
US 2023/0409753 A1 Dec. 21, 2023

(51) Int. Cl.
*G06F 21/64* (2013.01)
(52) U.S. Cl.
CPC .................................. *G06F 21/64* (2013.01)
(58) Field of Classification Search
CPC ............. G06F 21/64; G06F 2221/2151; H04L 9/3247; H04L 9/3297; H04L 9/50
USPC .......................................................... 726/26
See application file for complete search history.

(56) References Cited

U.S. PATENT DOCUMENTS

| 6,587,945 | B1 | 7/2003 | Pasieka |
| 2007/0192609 | A1 | 8/2007 | Yoshioka et al. |
| 2008/0086642 | A1 | 4/2008 | Takahashi |
| 2017/0286749 | A1* | 10/2017 | Tanaka .................... G06F 21/16 |

(Continued)

FOREIGN PATENT DOCUMENTS

| CN | 102623034 A * | 8/2012 |
| EP | 1280098 | 1/2003 |
| JP | 2007-027920 A | 2/2007 |

(Continued)

*Primary Examiner* — Aubrey H Wyszynski
(74) *Attorney, Agent, or Firm* — Sterne, Kessler, Goldstein & Fox P.L.L.C.

(57) ABSTRACT

The present invention provides a management device and a program with which it is possible to easily discriminate between the alteration and correction of an electronic document. A management device 1 for managing a user's electronic documents, the management device 1 comprising: a document acquisition unit 11 for acquiring an electronic document; an indication acquisition unit 12 for acquiring an indication to create a signature for the acquired electronic document; a generation unit 14 for generating unique text information on the basis of the acquired indication to create; a write unit 15 for writing signature information that includes the generated text information and time information that includes a signing time-of-day into the electronic document; a calculation unit 18 for calculating the hash value of the electronic document; a holding unit 16 for holding with respect to the signature information, time information and hash value in a management file that manages the electronic document; and an output unit 19 for outputting the electronic document that includes the written-in signature information and time information.

5 Claims, 4 Drawing Sheets

(56) References Cited

U.S. PATENT DOCUMENTS

2018/0278423 A1   9/2018   Bianzino et al.

FOREIGN PATENT DOCUMENTS

| JP | WO2016043197 A1 * | 4/2017 | ............. G06Q 10/10 |
| JP | 2018-067807 A | 4/2018 | |
| WO | WO 2016-043197 | 3/2016 | |
| WO | WO 2018/211475 | 11/2018 | |
| WO | WO-2022123635 A1 * | 6/2022 | ........... G06F 21/645 |

* cited by examiner

MANAGEMENT DEVICE AND PROGRAM

TECHNICAL FIELD

The present invention relates to a management device and a program.

BACKGROUND ART

Attempts have been made to use digital data instead of using paper contracts. It is known that, in digital data, an electronic signature is used for the purpose of proving that there has been no alteration. For example, an electronic signature system in which an electronic signature is signed on data to be signed has been proposed (see, e.g., Patent Document 1).

CITATION LIST

Patent Document

Patent Document 1: Patent Publication JP 2018-067807 A

SUMMARY

Technical Problem

In the electronic signature system in Patent Document 1, a comparison is made between a hash of digital data included in an electronic signature and a hash of the digital data at the time of browsing. When the hashes have different values as a result of the comparison, it is determined that the digital data has been altered. This makes it possible to detect the alteration of the digital data.

Meanwhile, in the electronic signature system in Patent Document 1, the electronic signature is made using a private key, and consequently it is necessary to manage the private key. Therefore, it is necessary to appropriately manage the private key. By contrast, it is preferable if electronic documents can easily be authenticated without using private keys.

The present invention has been achieved in view of the conventional situation described above, and an object thereof is to provide a management device and a program which allow an electronic document to be easily authenticated.

Solution to Problem

The present invention relates to a management device that manages an electronic document of a user, the management device including: a document acquisition unit that acquires the electronic document; an instruction acquisition unit that acquires a signature production instruction for the acquired electronic document; a generation unit that generates unique character information on the basis of the acquired production instruction; a write unit that writes, to the electronic document, signature information including the generated character information and time information representing a signature time; a calculation unit that calculates a hash of the electronic document; a holding unit that holds the signature information, the time information, and the hash in a management file that manages the electronic document; and an output unit that outputs the electronic document including the written signature information and time information.

It is preferable that the management device further includes a user information acquisition unit that acquires information on the user as user information, the write unit writes the user information, the signature information including the character information, and a time stamp to the electronic document, and the holding unit further holds the user information in the management file.

It is preferable that the management device further includes a correction unit that corrects a content of the electronic document, the document acquisition unit acquires details of the correction of the electronic document, the write unit imparts, to the electronic document after the correction, the signature information and the time information representing the signature time after the correction, the calculation unit calculates the hash of the electronic document after the correction, and the holding unit holds at least the calculated hash in the management file.

It is preferable that the holding unit holds the management file in an external network.

The present invention also relates to a program causing a computer to operate as a management device that manages an electronic document of a user, the program causing the computer to function as: a document acquisition unit that acquires the electronic document; an instruction acquisition unit that acquires a signature production instruction for the acquired electronic document; a generation unit that generates unique character information on the basis of the acquired production instruction; a write unit that writes, to the electronic document, signature information including the generated character information and time information representing a signature time; a calculation unit that calculates a hash of the electronic document; a holding unit that holds the signature information, the time information, and the hash in a management file that manages the electronic document; and an output unit that outputs the electronic document including the written signature information and time information.

Advantageous Effects of Invention

The present invention has been achieved in view of the conventional situation described above, and an object thereof is to provide a management device and a program which allow an electronic document to be easily authenticated.

DESCRIPTION OF EMBODIMENTS

Referring to FIGS. 1 to 4, a description will be given below of a management device 1 and a program each according to each of embodiments of the present invention.

First, a description will be given of an outline of the management device 1 in the present embodiment.

The management device 1 is a device that manages electronic documents such as contracts of users (such as, e.g., corporations). For example, the management device 1 writes an electronic signature to an electronic document to produce an electronic document indicating consent to the electronic document. In the following embodiment, the management device 1 produces the electronic signature without using a private key to thereby inhibit leakage of the private key and be able to easily authenticate the electronic document.

Note that, in the following embodiment, the "electronic document" refers to an electronically produced sentence among a contract, a cost estimate, an application, an order, a delivery slip, a bill, a receipt, an invoice, a minute, an approval request, and an application form. Meanwhile, the "electronic signature" refers to processing of electronically performing an act of signing a paper contract or the like on the electronic document.

The management device 1 also updates the electronic document determined to be a fixed file to thereby allow the electronic document to be corrected. Thus, the management device 1 inhibits the electronic document from being altered, while allowing the correction of the electronic document to be reflected. Accordingly, the management device 1 distinguishes between the alteration and the correction, and allows the correction to be easily reflected. The management device 1 uses the electronic signature, a signature time, and a hash in combination to thereby allow the correction, while ensuring a validity of the electronic document.

Figure 1:
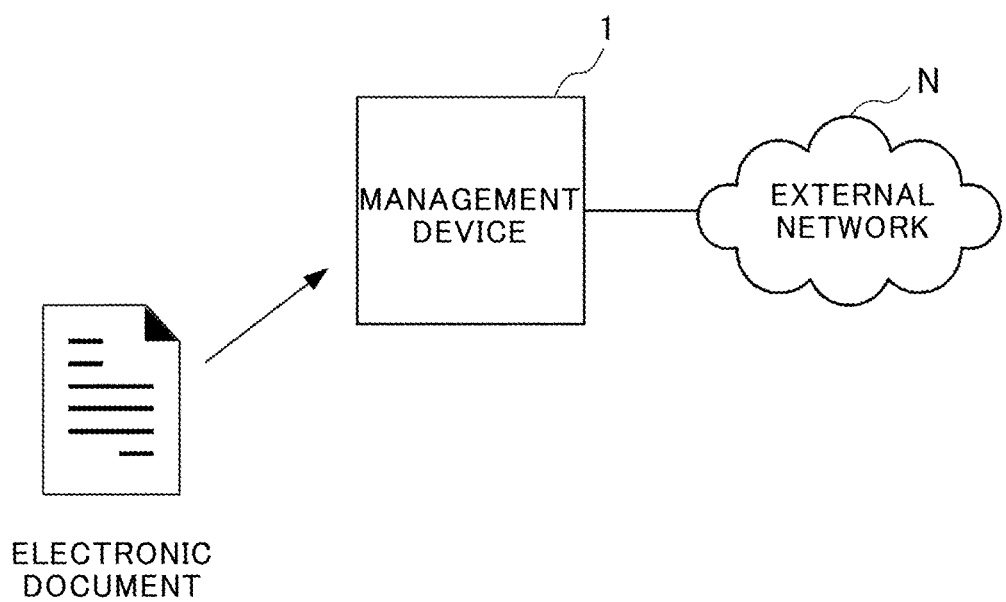
FIG. 1 is a schematic diagram illustrating an outline of an electronic signatured given by a management device according to an embodiment of the present invention.

As illustrated in FIG. 1, the management device 1 is connected to an external network N. The management device 1 produces a management file of the electronic document to which a time stamp and the electronic signature have been imparted. The management device 1 holds the produced management file of the electronic document in the external network N. The management device 1 holds the management file in, e.g., a blockchain. By verifying an identity between the saved management file and the electronic signature written to the electronic document, it is possible to facilitate authentication of the electronic document.

First Embodiment

Figure 2:
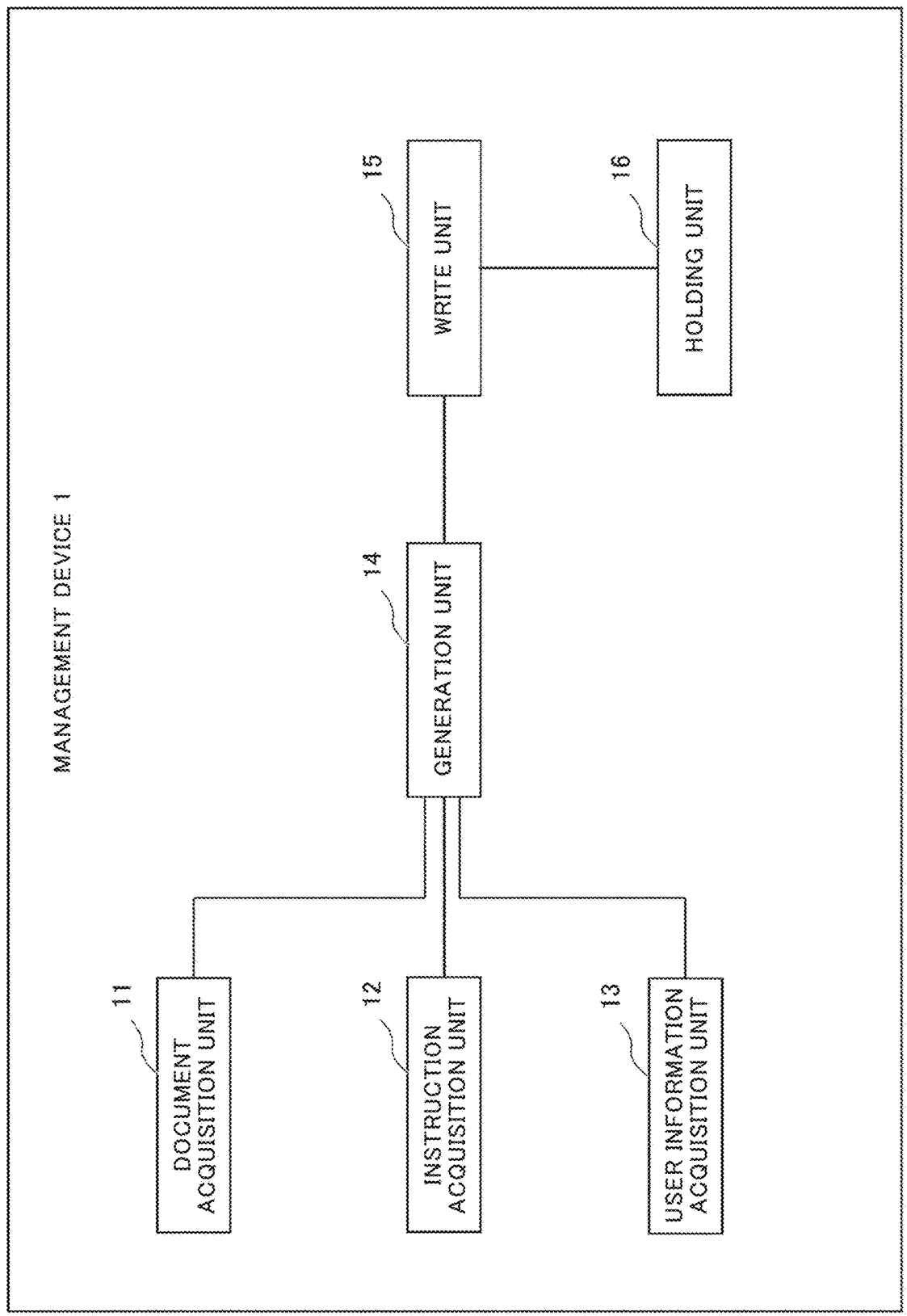
FIG. 2 is a block diagram illustrating a configuration of the management device in the embodiment.

Next, referring to FIGS. 1 and 2, a description will be given of the management device 1 and the program each according to the first embodiment of the present invention. The management device 1 according to the first embodiment is described for the management device 1 that writes the electronic signature and the signature time to the electronic document. The management device 1 is a device that manages the electronic documents of the users. As illustrated in FIG. 2, the management device 1 includes a document acquisition unit 11, an instruction acquisition unit 12, a user information acquisition unit 13, a generation unit 14, a write unit 15, a holding unit 16, a calculation unit 18, and an output unit 19.

The document acquisition unit 11 is implemented through, e.g., operation of a CPU. The document acquisition unit 11 acquires the electronic document. The document acquisition unit 11 acquires electronic data of, e.g., a contract or the like as the electronic document. For example, the document acquisition unit 11 acquires, as the electronic document, data obtained by scanning paper data, data produced by using a browser or an application, and the like.

The user information acquisition unit 13 is implemented through, e.g., the operation of the CPU. The user information acquisition unit 13 acquires information on the user as user information. In the present embodiment, the user information acquisition unit 13 acquires a user ID and a username of the user each issued in advance. The user information acquisition unit 13 acquires herein the user IDs and the usernames of contractors (users) as the user information.

The instruction acquisition unit 12 is implemented through, e.g., the operation of the CPU. The instruction acquisition unit 12 acquires a signature production instruction for the acquired electronic document. For example, the instruction acquisition unit 12 acquires an electronic signature production instruction from the user.

The generation unit 14 is implemented through, e.g., the operation of the CPU. The generation unit 14 generates unique character information on the basis of the acquired production instruction. For example, the generation unit 14 generates signature information including the character information. Note that the generation unit 14 may also cause the signature information to include another information (such as a username) in addition to the character information. Thus, the generation unit 14 generates different character information every time the electronic signature is given.

The write unit 15 is implemented through, e.g., the operation of the CPU. The write unit 15 gives, to the electronic document, the signature information including the generated character information and time information including the signature time. For example, the write unit 15 outputtably writes the username, the signature information, and a signature date to the electronic document. Specifically, the write unit 15 visually recognizably writes the usernames, the signature information, and the signature dates of all the contractors.

The holding unit 16 is implemented through, e.g., the operation of the CPU. The holding unit 16 holds the signature information and the time information in a management file that manages the electronic document. For example, the holding unit 16 holds the user ID, the username, the signature information, the signature date, and the hash of the electronic document in the management file different from the electronic document. Specifically, the holding unit 16 saves the user ID, the username, the signature information, the signature date, and the hash of the electronic document of each of the contractors in the management file different from the electronic document. The holding unit 16 holds the management file in the external network N. In the present embodiment, the holding unit 16 holds the management file in the blockchain.

The output unit 19 is implemented through, e.g., the operation of the CPU. The output unit 19 outputs the electronic document including the written signature information and time information. The output unit 19 outputs the electronic document including the signature information and the time information to, e.g., a display device (not shown) such as a display.

Next, a description will be given of operation of the management device 1.

First, the document acquisition unit 11 acquires the electronic document. Then, the user information acquisition unit 13 acquires the user information. Then, the instruction acquisition unit 12 acquires the electronic signature production instruction.

Then, the generation unit 14 generates the electronic signature. Then, the write unit 15 writes the electronic signature and the signature time to the electronic document. Then, the holding unit 16 holds the user ID, the username, the signature information, the signature date, and the hash of the electronic document of each of the contractors in the management file different from the electronic document.

Next, a description will be given of a method of verifying the identity of the electronic document.

First, the electronic signature and the time information each included in the electronic document are output together with the electronic document. Then, it is searched whether or not the output electronic signature and time information are included in the management file. When the output electronic signature and time information are included in the management file, it is determined whether or not the hash of the output electronic document is the same as the hash held in the corresponding management file. Meanwhile, when the output electronic signature and time information are not included in the management file, it can be determined that the electronic signature has been duplicated, and the electronic document is unauthorized.

When the hash is the same as the hash held in the management file, it can be determined that the output electronic document is an authorized electronic document. In this case, it is also possible to easily prove which user has made a contract from the user ID and username each included in the corresponding management file. Meanwhile, when the hash is not held in the management file, it can be determined that the original electronic document has been falsified.

Next, a description will be given of the program.

Each of configurations included in the management device 1 can be implemented by hardware, software, or a combination thereof. Being "implemented by software" used herein means being implemented by reading and execution of the program by a computer.

The program is stored using various types of non-transitory computer readable media, and can be supplied to the computer. The non-transitory computer readable media include various types of tangible storage media. Examples of the non-transitory computer readable media include a magnetic recording medium (e.g., a flexible disk, a magnetic tape, or a hard disk drive), a photomagnetic recording medium (e.g., a photomagnetic disk), a CD-ROM (Read Only Memory), a CD-R, a CD-R/W, and a semiconductor memory (e.g., a mask ROM, a PROM (Programmable ROM), an EPROM (Erasable PROM), a flash ROM, or a RAM (random access memory)). A display program may also be supplied to the computer via various types of transitory computer readable media. Examples of the transitory computer readable media include an electric signal, an optical signal, and an electromagnetic wave. The transitory computer readable media can supply the program to the computer via a wired communication path such as an electric wire or an optical fiber or a wireless communication path.

Thus, with an image management device 1 and the program each according to the present embodiment, the following effects are achieved.

(1) The management device 1 that manages an electronic document of a user includes the document acquisition unit 11 that acquires the electronic document, the instruction acquisition unit 12 that acquires a signature production instruction for the acquired electronic document, the generation unit 14 that generates unique character information on the basis of the acquired production instruction, the write unit 15 that writes, to the electronic document, signature information including the generated character information and time information representing a signature time, the holding unit 16 that holds the signature information, the time information, and the hash in a management file that manages the electronic document; and the output unit 19 that outputs the electronic document including the written signature information and time information.

A program that causes a computer to operate as the management device 1 that manages an electronic document of a user causes the computer to function as the document acquisition unit 11 that acquires the electronic document, the instruction acquisition unit 12 that acquires a signature production instruction for the acquired electronic document, the generation unit 14 that generates unique character information on the basis of the acquired production instruction, the write unit 15 that writes, to the electronic document, signature information including the generated character information and time information representing a signature time, the holding unit 16 that holds the signature information, the time information, and the hash in a management file that manages the electronic document, and the output unit 19 that outputs the electronic document including the written signature information and time information.

This allows the electronic signature to be given to the electronic document without using a private key. Since it is unnecessary to manage and use the private key, the private key need not be strictly managed, and the electronic document can easily be authenticated.

(2) The management device 1 further includes the user information acquisition unit 13 that acquires information on the user as user information, the write unit 15 imparts the user information, the signature information including the character information, and a time stamp to the electronic document, and the holding unit 16 further holds the user information in the management file. This allows the electronic document to be managed on a per user basis.

Second Embodiment

Figure 3:
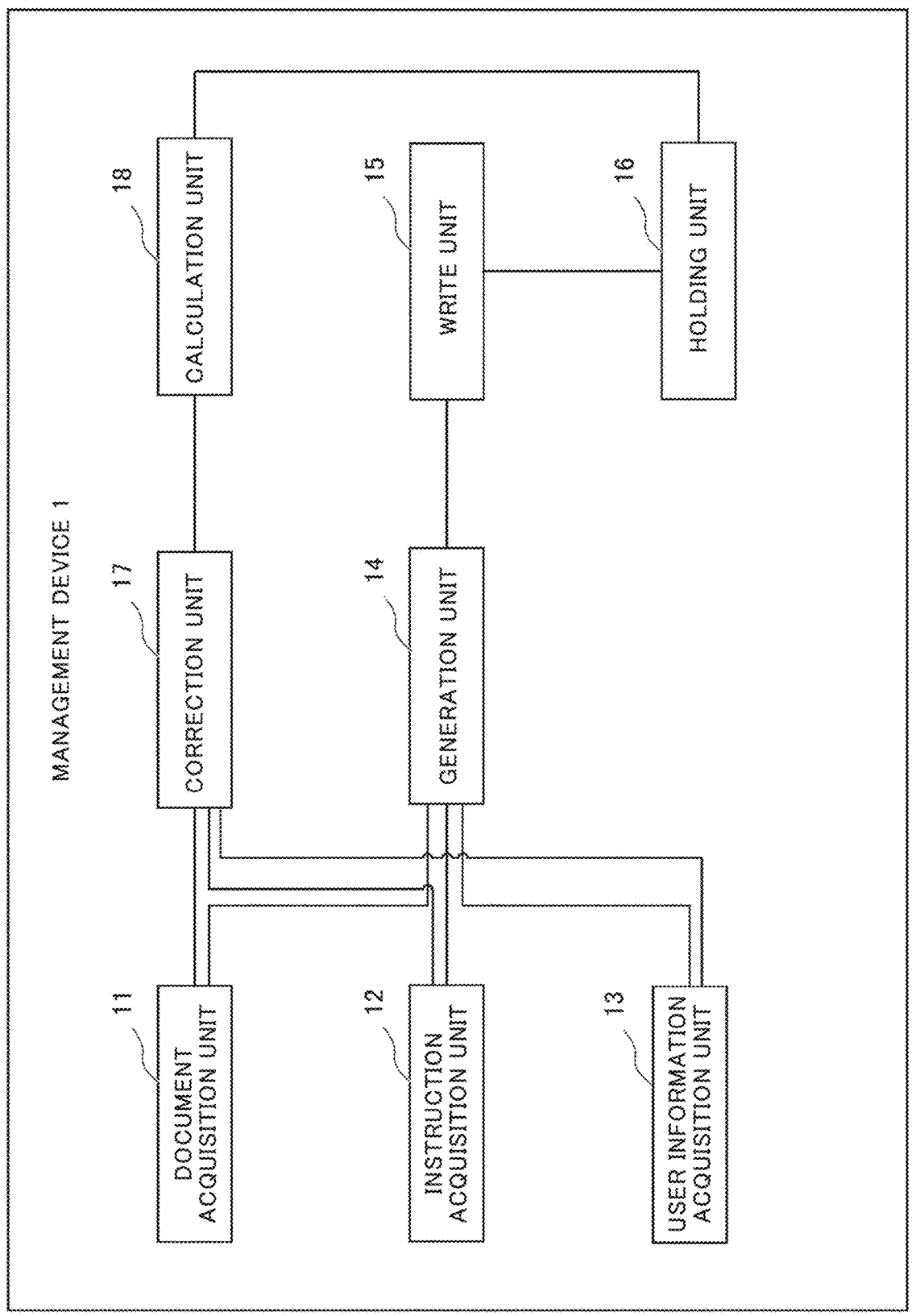
FIG. 3 is a flow chart illustrating a flow of an operation when an electronic signature is given to an electronic document in the management device in the embodiment.

Next, referring to FIGS. 3 and 4, a description will be given of the management device 1 and the program each according to the second embodiment of the present invention. In the description of the second embodiment, the same constituent features as those of the embodiment described previously are denoted by the same reference signs, and a description thereof is omitted or simplified. The management device 1 and the program each according to the second embodiment correct the electronic document to which the signature information and the time stamp have already been issued.

The management device 1 in the second embodiment is different from that in the first embodiment in terms of further including a correction unit 17. In addition, in the management device 1 in the second embodiment, respective configurations of the document acquisition unit 11, the instruction acquisition unit 12, the generation unit 14, the write unit 15, and the holding unit 16 are different from those in the first embodiment.

The document acquisition unit 11 acquires the electronic document in a corrected version.

The instruction acquisition unit 12 acquires, as identification information, information identifying the original electronic document to be corrected. In addition, the instruction acquisition unit 12 acquires an instruction to correct, according to the electronic document in the corrected version, the electronic document identified by the identification information.

The generation unit 14 produces a new electronic signature for the electronic document in the corrected version. For example, the generation unit 14 produces an electronic signature including new unique character information.

The correction unit 17 is implemented through, e.g., the operation of the CPU. The correction unit 17 corrects a content of the electronic document. The correction unit 17 corrects the identified electronic document on the basis of the electronic document in the corrected version. The correction unit 17 identifies the electronic document to be corrected by using, e.g., the user ID, the username, the electronic signature, and the signature date each held in the management file.

The write unit 15 writes the newly generated electronic signature to the electronic document after the correction. In addition, the write unit 15 writes, to the electronic document after the correction, time information representing the signature time of the newly generated electronic signature.

The holding unit 16 holds at least the calculated hash in the management file. For example, the holding unit 16 holds the user ID, the username, the new signature information, the time information, and the hash in the management file that manages the electronic document. For example, the holding unit 16 ties the management file after the correction to the management file before the correction and holds the management file after the correction.

Next, a description will be given of the operation of the management device 1.

Figure 4:
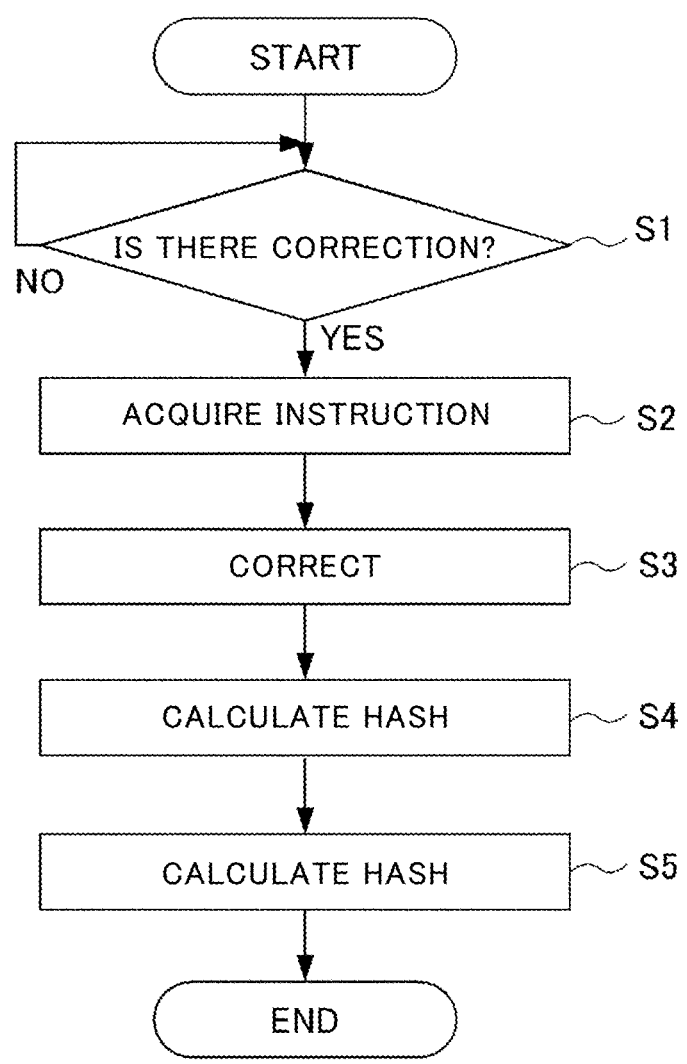
FIG. 4 is a flow chart illustrating a flow of an operation when the electronic document is corrected in the management device in the embodiment.

First, as illustrated in FIG. 4, it is determined whether or not the document acquisition unit 11 has acquired the electronic document in the corrected version (Step S1). When the document acquisition unit 11 has acquired the electronic document in the corrected version (YES in Step S1), processing advances to Step S2. Meanwhile, when the electronic document in the corrected version is not acquired (NO in Step S1), Step S1 is repeated.

In Step S2, the instruction acquisition unit 12 acquires a correction instruction. Then, the correction unit 17 corrects the electronic document (Step S3). Then, the calculation unit 18 calculates the hash of the corrected electronic document (Step S4). Then, the write unit 15 writes the electronic signature and the signature time to the electronic document (Step S5). Then, and the holding unit 16 holds, in the management file, the user ID, the username, the signature information, the signature time, and the hash each related to the corrected electronic document (Step S6). Thus, the processing according to this flow is ended.

Next, a description will be given of a method of correction and identity verification.

First, the electronic signature and the time information each included in the electronic document in the corrected version are output together with the electronic document. Then, it is searched whether or not the output electronic signature and time information are included in the management file. When the output electronic signature and time information are included in the management file, it is determined whether or not the hash of the output electronic document is the same as the hash held in the corresponding management file. Meanwhile, when the output electronic signature and time information are not included in the management file, it can be determined that the electronic signature has been duplicated, and the electronic document is unauthorized.

When the hash is the same as the hash held in the management file, it can be determined that the output electronic document is an authorized electronic document. In this case, it is possible to easily prove which user has made a contract from the user ID and username each included in the corresponding management file. Meanwhile, when the hash is not held in the management file, it can be determined that the original electronic document has been falsified.

Thus, with the image management device 1 and the program each according to the present embodiment, the following effects are achieved.

(3) The management device 1 further includes the correction unit 17 that corrects a content of the electronic document, the document acquisition unit 11 acquires details of the correction of the electronic document, the write unit 15 writes, to the electronic document after the correction, the signature information and the time information representing the signature time after the correction, the calculation unit 18 calculates the hash of the electronic document after the correction, and the holding unit 16 holds at least the calculated hash in the management file. Thus, it is possible to ensure an identity between the calculated hash and the electronic document after the correction. Consequently, even after the correction is made, it is possible to determine the presence or absence of alteration.

(4) The holding unit 16 holds the management file in an external network N. Thus, it is possible to inhibit the management file from being lost. Consequently, it is possible to prevent the inability to check the electronic document against the management file.

While the description has been given heretofore of each of the preferred embodiments of the management device 1 and the program of the present invention, the present disclosure is not limited to the embodiment described above, and can appropriately be modified.

For example, in the embodiment described above, the user ID is produced in advance, but the present disclosure is not limited thereto. It may also be possible to acquire, as the user information, a mail address instead of the user ID. In the case of a contract, a plurality of the user IDs and usernames are used, but it may also be possible to use one user as an electronic corporate seal.

Alternatively, in the embodiment described above, it may also be possible to give an electronic signature instruction with timing different from one user to another. In other words, the generation unit 14 may also produce the electronic signature and the time stamp at a time when instructions have been acquired from all the users.

Alternatively, in the embodiment described above, when the original is corrected according to the electronic document in the corrected version, it may also be possible to directly hold the previous electronic signature in the electronic document. Alternatively, the holding unit 16 may also hold the previous electronic signature in the management file. This allows a correction history to be easily checked.

In the first embodiment described above, the write unit 15 may also write, e.g., for a plurality of the users, the signature information and the signature time of each of the users to the electronic document on the basis of the signature instruction from each of the users. The holding unit 16 may also write the signature information and the signature times to the electronic document on the basis of the signature instructions from all the users, and then hold the user IDs, the usernames, the signature information, the signature times, and the hashes of all the users in the management file.

In the second embodiment described above, it is described that the generation unit 14 newly generates the character information, but the present disclosure is not limited thereto. The generation unit 14 may also be configured to directly use the signature information before the correction corresponding to the user. In other words, the write unit 15 may also write the signature information before the correction and a new signature time to the electronic document after the correction.

Alternatively, in the embodiments described above, the write unit 15 may also affix the time stamp to the electronic document in order to confirm the conclusion of a contract and provide a fixed file.

REFERENCE SIGNS LIST

1 Management device
11 Document acquisition unit
12 Instruction acquisition unit
13 User information acquisition unit
14 Generation unit
15 Write unit
16 Holding unit
17 Correction unit
18 Calculation unit
N External network

What is claimed is:

1. A management device that manages an electronic document of a user, the management device comprising:
   a document acquisition unit that acquires the electronic document;
   an instruction acquisition unit that acquires a signature production instruction for the electronic document;
   a generation unit that generates unique character information on the basis of the signature production instruction;
   a write unit that writes, to the electronic document, signature information including the character information and time information representing a signature time;
   a calculation unit that calculates a hash of the electronic document;
   a holding unit that holds the signature information, the time information, and the hash in a management file that manages the electronic document;
   an output unit that outputs the electronic document including the signature information and time information; and
   a correction unit that makes a correction to a content of the electronic document, wherein:
   the write unit writes, to the electronic document after the correction, the signature information including new unique character information and the time information representing the signature time after the correction,
   the calculation unit calculates the hash of the electronic document after the correction, and
   the holding unit holds at least the hash calculated by the calculation unit in the management file.

2. The management device according to claim 1, further comprising
   a user information acquisition unit that acquires information on the user as user information, wherein:
   the write unit imparts the user information, the signature information including the character information, and a time stamp to the electronic document, and
   the holding unit further holds the user information in the management file.

3. The management device according to claim 1, wherein the document acquisition unit acquires details of the correction of the content of the electronic document.

4. The management device according to claim 1, wherein the holding unit holds the management file in an external network.

5. A non-transitory computer readable medium storing a program causing a computer to operate as a management device that manages an electronic document of a user, the program causing the computer to function as:
   a document acquisition unit that acquires the electronic document;
   an instruction acquisition unit that acquires a signature production instruction for the electronic document;
   a generation unit that generates unique character information on the basis of the acquired signature production instruction;
   a write unit that writes, to the electronic document, signature information including the character information and time information representing a signature time;
   a calculation unit that calculates a hash of the electronic document;
   a holding unit that holds the signature information, the time information, and the hash in a management file that manages the electronic document;
   an output unit that outputs the electronic document including the written-signature information and time information; and
   a correction unit that makes a correction to a content of the electronic document, wherein:
   the write unit writes, to the electronic document after the correction, the signature information including new unique character information and the time information representing the signature time after the correction,
   the calculation unit calculates the hash of the electronic document after the correction, and
   the holding unit holds at least the hash calculated by the calculation unit in the management file.

* * * * *